(12) United States Patent
Aburada et al.

(10) Patent No.: US 10,800,696 B2
(45) Date of Patent: *Oct. 13, 2020

(54) METHODS AND SYSTEMS FOR PROCESSING OF GLASS RIBBON

(71) Applicant: CORNING INCORPORATED, Corning, NY (US)

(72) Inventors: Tomohiro Aburada, Painted Post, NY (US); Douglas Edward Brackley, Horseheads, NY (US); Gautam Narendra Kudva, Horseheads, NY (US); Shawn Rachelle Markham, Harrodsburg, KY (US); Gary Edward Merz, Rochester, NY (US); Eric Lee Miller, Corning, NY (US)

(73) Assignee: Corning Incorporated, Corning, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/574,998

(22) PCT Filed: May 17, 2016

(86) PCT No.: PCT/US2016/032807
§ 371 (c)(1),
(2) Date: Nov. 17, 2017

(87) PCT Pub. No.: WO2016/187171
PCT Pub. Date: Nov. 24, 2016

(65) Prior Publication Data
US 2018/0134605 A1 May 17, 2018

Related U.S. Application Data

(60) Provisional application No. 62/163,056, filed on May 18, 2015.

(51) Int. Cl.
*C03B 33/023* (2006.01)
*C03B 33/037* (2006.01)
*C03B 17/06* (2006.01)

(52) U.S. Cl.
CPC ........ *C03B 33/0235* (2013.01); *C03B 17/068* (2013.01); *C03B 33/037* (2013.01)

(58) Field of Classification Search
CPC . C03B 33/0235; C03B 17/068; C03B 33/037; Y02P 40/57; Y02P 40/51
See application file for complete search history.

(56) References Cited

U.S. PATENT DOCUMENTS 2,259,162 A 10/1941 Hirsch
3,944,461 A * 3/1976 Ogron ............... B32B 17/10935
156/538

(Continued)

FOREIGN PATENT DOCUMENTS

JP 2012096989 A 5/2012
JP 2015044713 A * 3/2015 ............. C03B 33/02

(Continued)

OTHER PUBLICATIONS

International Search Report and Written Opinion of the International Searching Authority; PCT/US2016/032807; dated Aug. 18, 2016; 12 Pages; European Patent Office.

*Primary Examiner* — Nahida Sultana
(74) *Attorney, Agent, or Firm* — Ryan T. Hardee

(57) ABSTRACT

A method and apparatus for processing glass comprising a forming apparatus in a first processing zone, the forming apparatus configured to form a glass ribbon having a first direction of travel in the first processing zone. The apparatus also includes a first cutting apparatus in a second processing zone, the first cutting apparatus configured to separate one or more portions of the glass ribbon, the glass ribbon having a second direction of travel. The apparatus includes a first (Continued)

buffer zone between the first processing zone and the second processing zone in which the glass ribbon is supported in a first catenary between two, spaced-apart payoff positions. The second direction of travel in the second processing zone can be orthogonal to the first direction of travel in the first processing zone.

14 Claims, 9 Drawing Sheets

(56) References Cited

U.S. PATENT DOCUMENTS

| | | | |
|---|---|---|---|
| 4,162,907 A * | 7/1979 | Anderson | C03B 5/0275 65/101 |
| 5,176,733 A * | 1/1993 | Koss | C03B 23/0258 65/107 |
| 6,502,423 B1 | 1/2003 | Ostendarp et al. | |
| 6,853,123 B1 | 2/2005 | Nattermann et al. | |
| 8,075,999 B2 | 12/2011 | Barefoot et al. | |
| 8,359,887 B2 * | 1/2013 | Bisson | C03B 40/04 65/101 |
| 9,701,569 B2 * | 7/2017 | DeMartino | C03C 3/091 |
| 9,790,121 B2 | 10/2017 | Abramov et al. | |
| 10,570,047 B2 * | 2/2020 | Aburada et al. | C03B 17/068 65/29.18 |
| 2005/0016214 A1 | 1/2005 | Hsu | |
| 2009/0107182 A1 | 4/2009 | Anderson | |
| 2011/0314870 A1 | 12/2011 | Fredholm | |
| 2012/0125967 A1 | 5/2012 | Furuta | |
| 2012/0247154 A1 | 10/2012 | Abromov | |
| 2012/0304695 A1 | 12/2012 | Lakota | |
| 2013/0126576 A1 | 5/2013 | Marshall et al. | |
| 2013/0133369 A1 | 5/2013 | Lock | |
| 2013/0133371 A1 | 5/2013 | Burdette | |
| 2014/0017475 A1 | 1/2014 | Teranishi | |
| 2014/0130649 A1 * | 5/2014 | Chang | C03B 21/00 83/26 |
| 2014/0137601 A1 * | 5/2014 | Aburada | C03B 17/067 65/29.18 |
| 2015/0218034 A1 | 8/2015 | Bigelow | |
| 2015/0251944 A1 | 9/2015 | Brackley | |
| 2015/0259236 A1 | 9/2015 | Marshall | |
| 2015/0367444 A1 | 12/2015 | Abramov et al. | |
| 2016/0075589 A1 | 3/2016 | Shi | |
| 2017/0197864 A1 | 7/2017 | Aburada et al. | |
| 2018/0134605 A1 | 5/2018 | Aburada | |
| 2018/0141847 A1 | 5/2018 | Booth | |
| 2018/0141848 A1 | 5/2018 | Aburada | |
| 2019/0010072 A1 * | 1/2019 | Aburada | C03B 17/068 |

FOREIGN PATENT DOCUMENTS

| | | |
|---|---|---|
| WO | 0041978 A1 | 7/2000 |
| WO | 2002014229 A1 | 2/2002 |
| WO | 2012176594 A1 | 12/2012 |
| WO | 2013025741 A1 | 2/2013 |
| WO | 2014051984 A1 | 4/2014 |
| WO | 2014074400 A2 | 5/2014 |
| WO | 2014120626 A1 | 8/2014 |
| WO | 2015029669 A1 | 3/2015 |
| WO | 2016064950 A1 | 4/2016 |
| WO | 2016149458 A1 | 9/2016 |
| WO | 2016187173 A1 | 11/2016 |

* cited by examiner

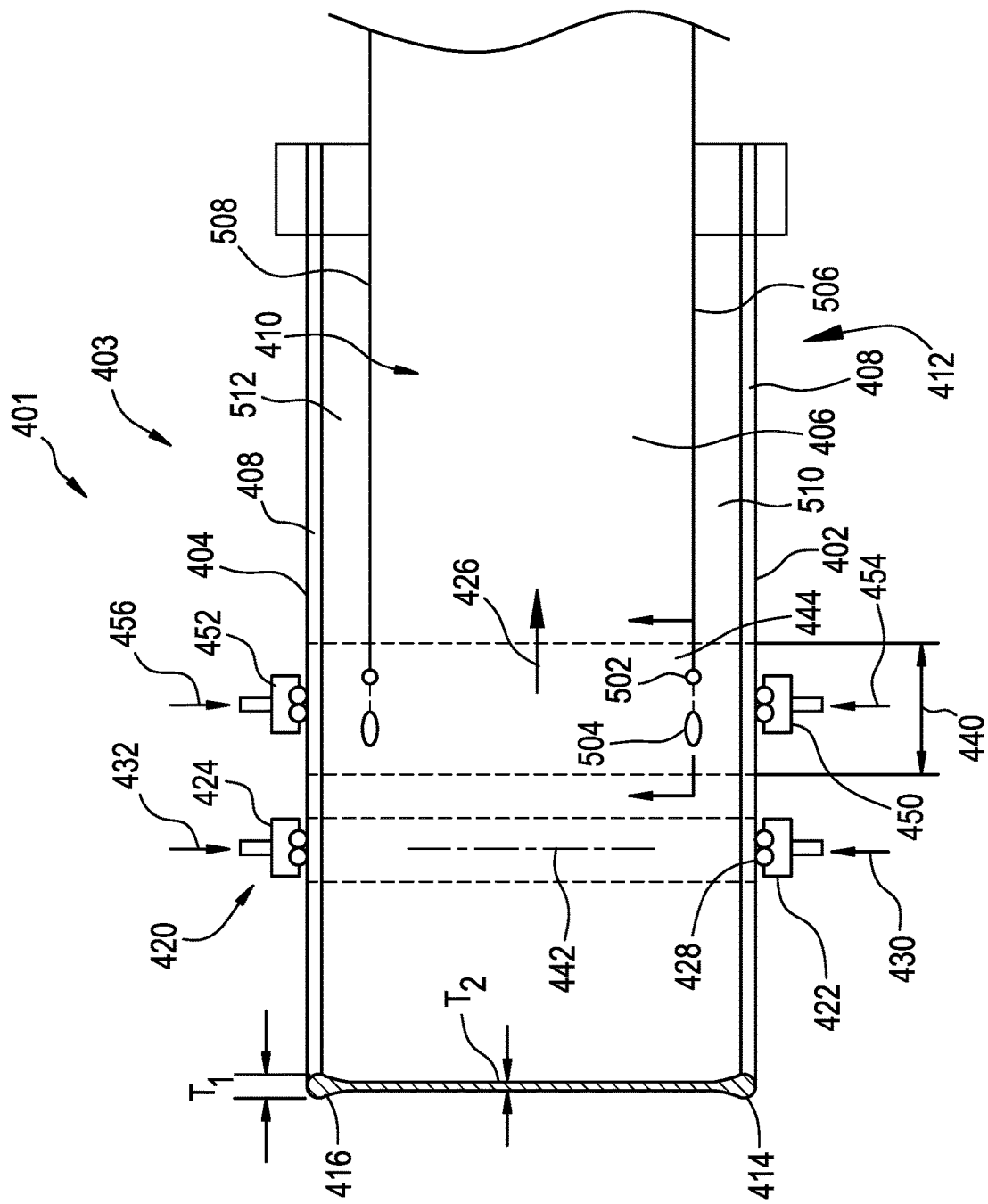

METHODS AND SYSTEMS FOR PROCESSING OF GLASS RIBBON

CROSS-REFERENCE TO RELATED APPLICATIONS

This application claims the benefit of priority under 35 U.S.C. § 371 of International Patent Application Serial No. PCT/US16/32807, filed on May 17, 2016, which in turn, claims the benefit of priority of U.S. Provisional Patent Application Ser. No. 62/163,056 filed on May 18, 2015, the contents of each of which are relied upon and incorporated herein by reference in their entireties.

TECHNICAL FIELD

Embodiments described herein relate to systems, apparatus, and methods for processing of a glass ribbon.

BACKGROUND

Glass processing apparatus are commonly used to form various glass products for sheet glass used in display applications. Glass substrates in flexible electronic applications are becoming thinner and lighter. Glass substrates having thicknesses lower than 0.5 mm, for example less than 0.3 mm, for example 0.1 mm or even thinner can be desirable for certain display applications, including laptop computers, handheld devices, and the like.

Glass substrates used in the manufacture of display devices are often processed in sheet form. Traditional sheet manufacturing processes can include a forming machine and a traveling anvil robot which scores and separates the sheet immediately after forming. This cut sheet is then passed downstream for further processing, inspection and packaging. Such processing can include, for example, the deposition of thin film electronics onto the substrate. Traditional sheet form handling has relatively slow processing speeds compared to continuous processes, since sheets must be individually transported, fixtured, processed and removed. Continuous processing of glass substrates in ribbon form can provide relatively faster manufacturing rates; however, there is still a need in the art to provide tension and shape control, to provide control of steering, and to reduce motion and isolate disturbances in a glass ribbon while providing sheet handling when needed.

SUMMARY

In some embodiments a method of processing a glass ribbon is provided. The method can comprise forming a glass ribbon in a first processing zone, continuously feeding the glass ribbon from the first processing zone having a first direction of travel to a second processing zone having a second direction of travel orthogonal to the first direction of travel, controlling feed rate of the glass ribbon through each of the first processing zone and second processing zone using a global control device, cutting the glass ribbon in the second processing zone, and isolating the first processing zone from perturbations occurring in the second processing zone.

In further embodiments, a glass processing apparatus is provided comprising a forming apparatus in a first processing zone, the forming apparatus configured to form a glass ribbon having a first direction of travel in the first processing zone, a first cutting apparatus in a second processing zone, the first cutting apparatus configured to separate one or more portions of the glass ribbon, the glass ribbon having a second direction of travel, and a first buffer zone between the first processing zone and the second processing zone in which the glass ribbon is supported in a first catenary between two, spaced-apart payoff positions where the second direction of travel in the second processing zone is orthogonal to the first direction of travel in the first processing zone.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, aspects and advantages of the present disclosure can be further understood when read with reference to the accompanying drawings:

FIG. 4 is a schematic, plan view of an embodiment of an edge trimming method and apparatus;

DETAILED DESCRIPTION

Figure 1:
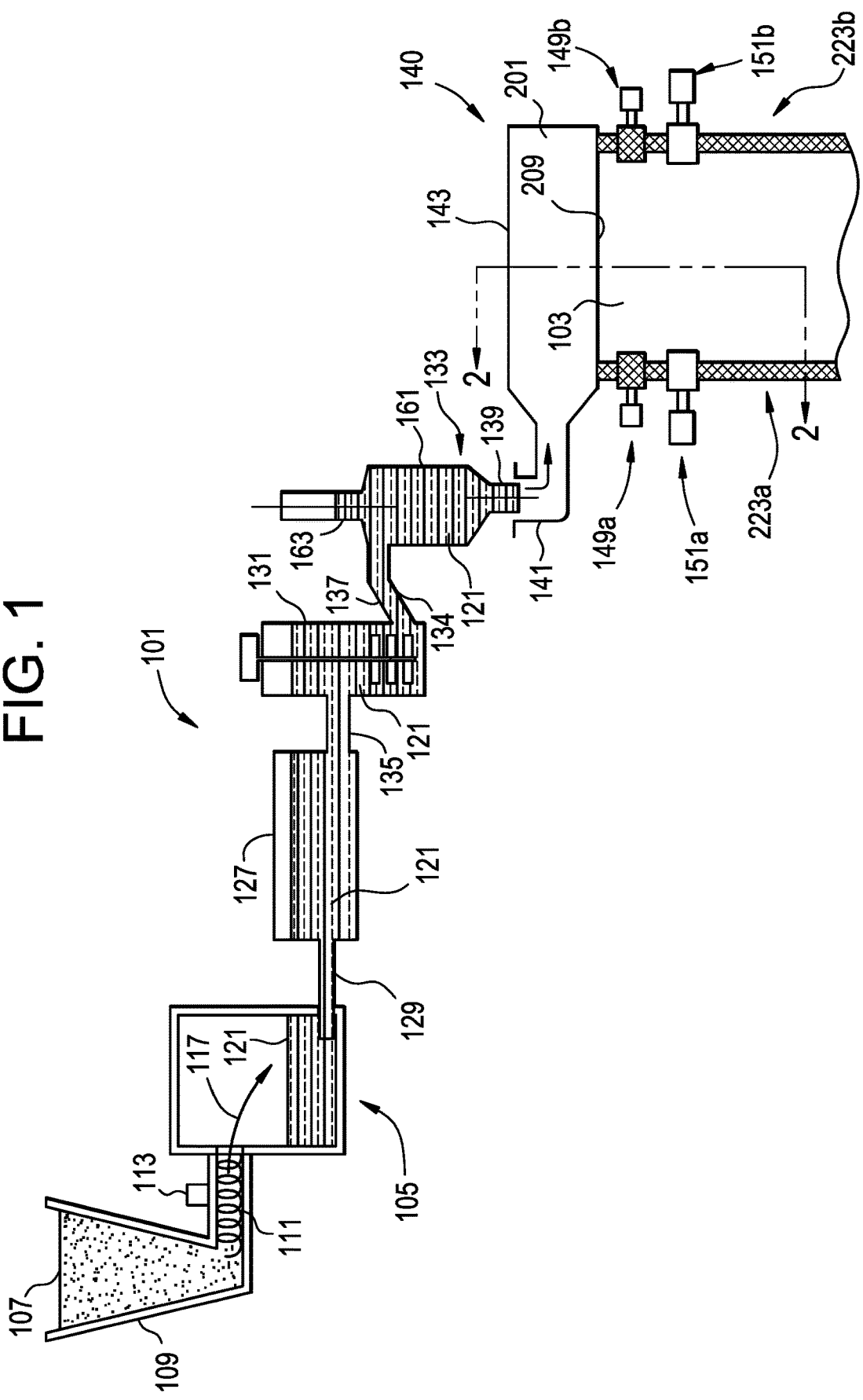
FIG. 1 is a schematic illustration of a glass manufacturing apparatus according to an embodiment of the disclosure.

In the following detailed description, for purposes of explanation and not limitation, exemplary embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Various glass manufacturing apparatus and methods of the disclosure may be used to produce glass articles (e.g., containers, ribbons etc.). In one embodiment, glass manufacturing systems and methods may be used to produce glass articles comprising a glass ribbon that may be further processed into one or more glass sheets. For instance, a glass manufacturing apparatus may be configured to form a glass ribbon by a down-draw, up-draw, float, fusion, press rolling, slot draw, or other glass forming techniques. The glass ribbon from any of these processes may be subsequently divided to provide sheet glass suitable for further processing into a desired display application. The glass sheets can be used in a wide range of display applications, for embodiment liquid crystal displays (LCDs), electrophoretic displays (EPD), organic light emitting diode displays (OLEDs), plasma display panels (PDPs), or the like. The systems, apparatus, and methods described herein facilitate continuous processing of glass ribbon by these exemplary forming processes by isolating various processing zones from one another using free loops (which may also be called buffer zones or catenaries) in the glass ribbon between processing zones. The processing zones may include forming, edge separation, cutting, winding, or the like; however, other types of processing zones may also be utilized. Further, speed and tension of the glass ribbon may be controlled locally within the processing zones using a global control device, for example a computer that monitors conditions within each of the zones. Such apparatus and methods can be used to drive the glass ribbon at desired locations while maintaining tension and shape, controlling steering, reducing motion and isolating disturbance.

FIG. 1 schematically illustrates an embodiment of a glass manufacturing apparatus 101 configured to draw a glass ribbon 103. With reference to FIG. 1, the glass manufacturing apparatus 101 is illustrated as a fusion down-draw apparatus although other glass manufacturing apparatus configured for up-draw, float, press rolling, slot draw, etc. may be provided in further embodiments. Moreover, as mentioned above, embodiments of the disclosure are not limited to producing glass ribbon. Indeed, the concepts presented in the present disclosure may be used in a wide range of glass manufacturing apparatus to produce a wide range of glass articles.

As illustrated, the glass manufacturing apparatus 101 can include a melting vessel 105 configured to receive batch material 107 from a storage bin 109. The batch material 107 can be introduced by a batch delivery device 111 powered by a motor 113. The motor 113 can introduce a desired amount of batch material 107 into the melting vessel 105, as indicated by arrow 117. The melting vessel 105 may then melt the batch material 107 into a quantity of molten material 121.

The glass manufacturing apparatus 101 can also include a fining vessel 127, for example a fining tube, located downstream from the melting vessel 105 and coupled to the melting vessel 105 by way of a first connecting tube 129. A mixing vessel 131, for example a stir chamber, can also be located downstream from the fining vessel 127 and a delivery apparatus 133 may be located downstream from the mixing vessel 131. As shown, a second connecting tube 135 can couple the fining vessel 127 to the mixing vessel 131 and a third connecting tube 137 can couple the mixing vessel 131 to the delivery apparatus 133. As further illustrated, an optional delivery pipe 139 can be positioned to deliver molten material 121 from a delivery vessel 161 of the delivery apparatus 133 to a fusion draw machine 140. As discussed more fully below, the fusion draw machine 140 may be configured to draw the molten material 121 into the glass ribbon 103. In the illustrated embodiment, the fusion draw machine 140 can include a forming vessel 143 provided with an inlet 141 configured to receive molten material from the delivery vessel 161 either directly or indirectly, for example by the delivery pipe 139. If provided, the delivery pipe 139 can be configured to receive molten material from the delivery vessel 161 and the inlet 141 of the forming vessel 143 can be configured to receive molten material from the delivery pipe 139.

The melting vessel 105 and features of the forming vessel 143 are typically made from a refractory material, for example refractory ceramic (e.g. ceramic brick, ceramic monolithic forming body, etc.). The glass manufacturing apparatus 101 may further include components that are typically made from platinum or platinum-containing metals for example platinum-rhodium, platinum-iridium and combinations thereof, but which may also comprise such refractory metals as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the mixing vessel 131 (e.g., a stir chamber), the third connecting tube 137, the inlet 141 and features of the forming vessel 143. Portions of the delivery apparatus 133 can also include platinum-containing components such as the delivery vessel 161, the delivery pipe 139 and/or a stand pipe 163 of the delivery apparatus 133.

Figure 2:
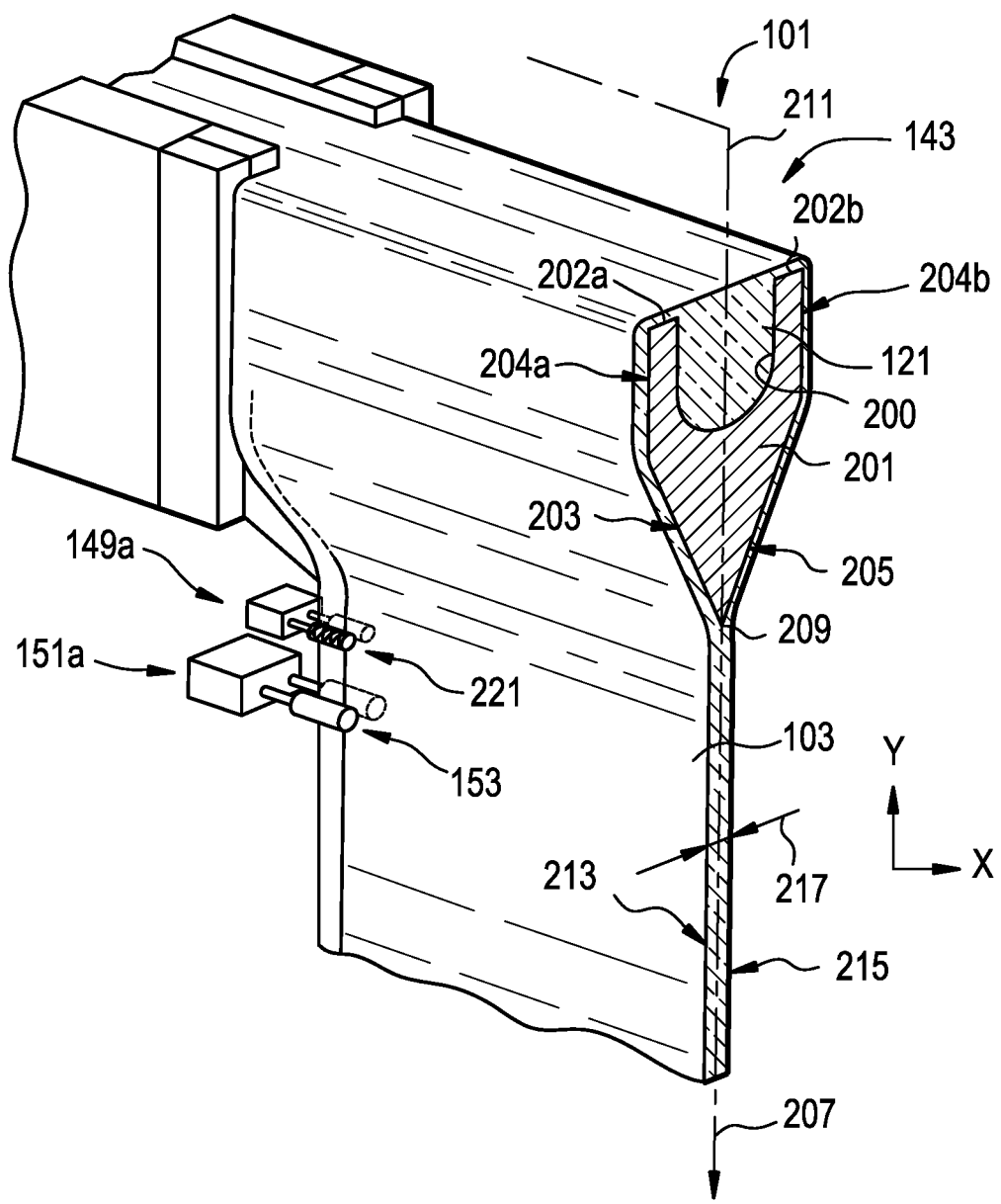
FIG. 2 is a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. With reference to FIG. 2, the forming vessel 143 can include a trough 200 configured to receive the molten material 121 from the inlet 141. The forming vessel 143 further includes a forming wedge 201 comprising a pair of downwardly inclined converging surface portions 203, 205 extending between opposed ends of the forming wedge 201. The pair of downwardly inclined converging surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

With continued reference to FIG. 2, in one embodiment, the molten material 121 can flow from the inlet 141 into the trough 200 of the forming vessel 143. The molten material 121 can then overflow from the trough 200 by simultaneously flowing over corresponding weirs 202a, 202b and downward over the outer surfaces 204a, 204b of the corresponding weirs 202a, 202b. Respective streams of molten material then flow along the downwardly inclined converging surface portions 203, 205 of the forming wedge 201 to be drawn off the root 209 of the forming vessel 143, where the flows converge and fuse into the glass ribbon 103. The glass ribbon 103 may then be drawn off the root 209 in the draw plane 211 along draw direction 207.

As shown in FIG. 2, the glass ribbon 103 may be drawn from the root 209 with a first major surface 213 and a second major surface 215. As shown, the first major surface 213 and the second major surface 215 face opposite directions with a thickness 217 that can be less than or equal to about 1 mm, for example, from about 50 μm to about 750 μm, for example from about 100 μm to about 700 μm, for example from about 200 μm to about 600 μm, for example from about 300 μm to about 500 μm, and all subranges therebetween. In addition to the above ranges and subranges, in further embodiments, the thickness 217 can be greater than 1 mm, for example from about 1 mm to about 3 mm and all subranges there between.

In some embodiments, the glass manufacturing apparatus 101 for fusion drawing a glass ribbon can also include at least one edge roll assembly 149a, 149b. Each illustrated edge roll assembly 149a, 149b can include a pair of edge rolls 221 configured to provide proper finishing of the corresponding opposed edge portions 223a, 223b of the glass ribbon 103. In further embodiments, the glass manufacturing apparatus 101 can further include a first and second pull or stub roll assembly 151a, 151b. Each illustrated pull or stub roll assembly 151a, 151b can include a pair of rollers 153 configured to facilitate pulling of the glass ribbon 103 in the draw direction 207 of the draw plane 211.

Figure 3A:
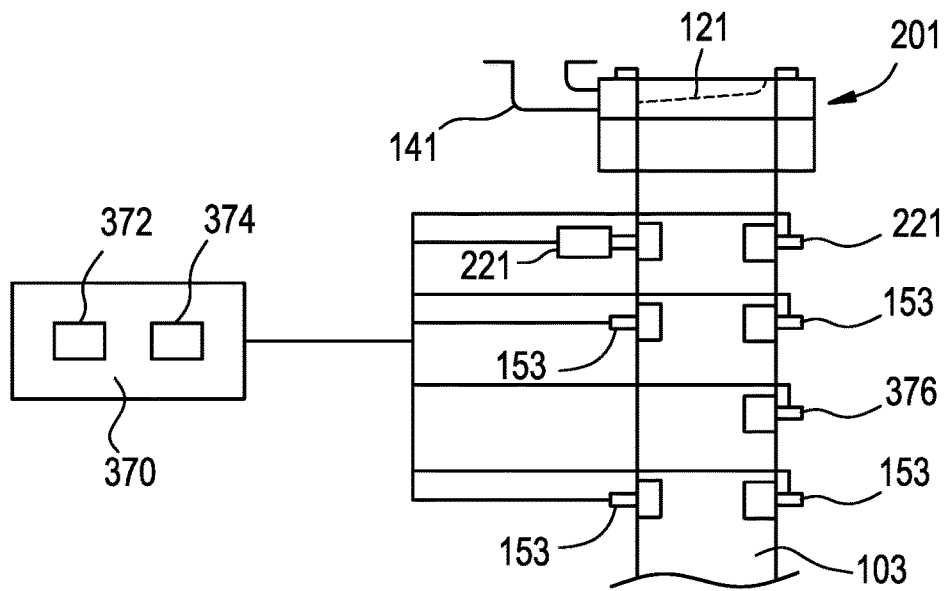
FIG. 3A is a schematic view of an embodiment of a glass forming method and apparatus.
Figure 3B:
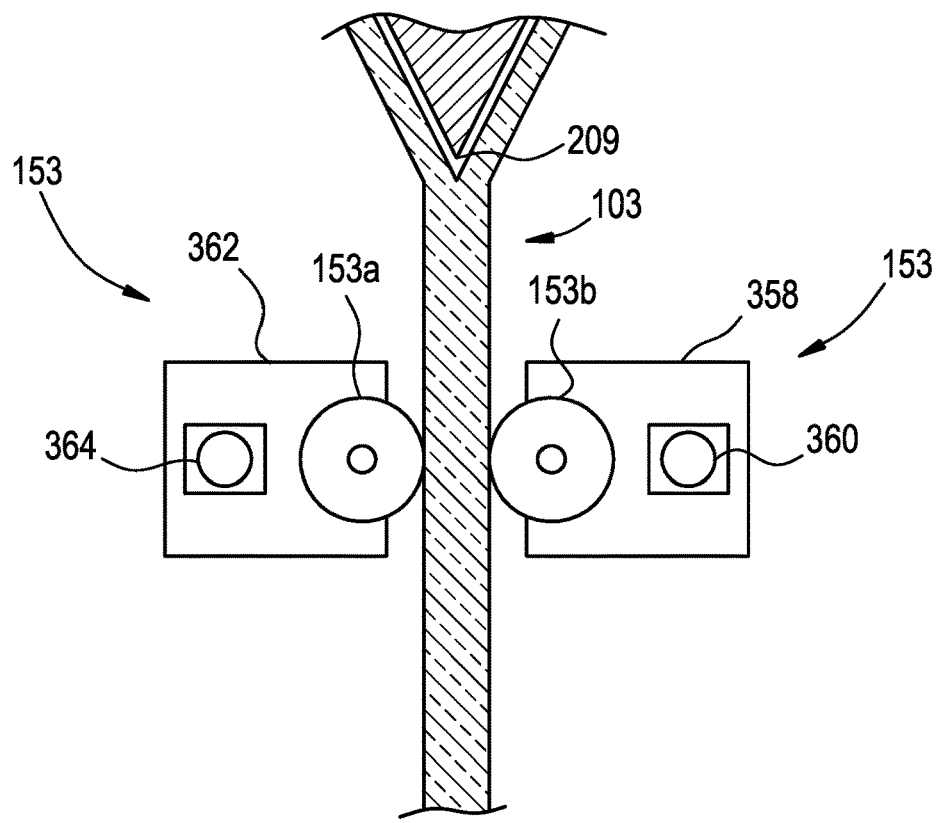
FIG. 3B is a schematic, detail view of the glass forming process and apparatus of FIG. 1.

FIGS. 3A and 3B are schematic illustrations showing another embodiment of the present subject matter. With reference to FIGS. 3A and 3B, some embodiments may include a plurality of actively-driven stub roller pairs 153 each of which can include a front-side stub roller 153a and a rear-side stub roller 153b. The front-side stub roller 153a can be coupled to a front-side transmission 362, which can be coupled to a front-side motor 364. The front-side transmission 362 modifies the output speed and torque of the front-side motor 364 that can be delivered to the front-side stub roller 153a. Similarly, the rear-side stub roller 153b can be coupled to a rear-side transmission 358, which can be coupled to a rear-side motor 360. The rear-side transmission 358 modifies the output speed and torque of the rear-side motor 360 that can be delivered to the rear-side stub roller 153b. While not shown, any one, several or pairs of rollers may be tilted or angled.

Operation of any number of stub roller pairs 153 or other devices can be controlled by a global control device 370 (e.g., a programmable logic controller—PLC) for a variety of conditions including, for example and without limitation, torque applied to the glass ribbon 103 and rate of rotation of the stub rollers 153a, 153b. Draw forces applied to the glass ribbon 103 by the plurality of stub roller pairs 153 while the glass ribbon 103 is still in a visco-elastic state can cause the glass ribbon 103 to pull or stretch, thereby controlling the dimensions of the glass ribbon 103 by controlling the tension applied to the glass ribbon 103 in one or both the draw and cross-draw directions as the glass ribbon 103 translates along the fusion draw machine 140, while also imparting motion to the glass ribbon 103.

The global control device 370 may include computer readable instructions stored in memory 372 and executed by a processor 374 that can determine, among other things, draw tension and speed of the glass ribbon 103 provided by the stub roller pairs 153, for example, using any suitable sensors that provide feedback to the global control device 370. Further, the computer readable instructions can allow modification of parameters, for example torque and velocity of the stub roller pairs 153 in light of feedback from the sensors. As one example, a stub roller 376 may be provided that communicates with the global control device 370 to indicate rate of rotation. The rate of rotation of the stub roller 376 with the glass ribbon 103 can be used by the global control device 370 to determine the extrinsic linear feed rate of the glass ribbon 103 as the glass ribbon 103 moves thereby. Although there is shown one pair of stub rollers 153 on each side of the ribbon, any suitable number of these type of stub roller pairs may be used, depending upon draw length and desired control. Similarly, although two of stub roller pairs 153 are shown on each side of the ribbon, any suitable number of these type of stub roller pairs 153 may also be used.

As the glass ribbon 103 is drawn through the fusion draw machine 140, the glass has an opportunity to cool. An exemplary glass manufacturing apparatus having a plurality of stub roller pairs 153 may improve the control and consistency of the cross-draw tension and/or down-drawn tension in the area in which the glass ribbon 103 goes through a visco-elastic transformation. This area may be defined as the "setting zone" in which the stress and flatness are set into the glass ribbon 103. A glass manufacturing system that includes the plurality of actively driven stub roller pairs 153 may provide improvements in the manufacturing of a glass ribbon 103 as compared to conventionally designed manufacturing apparatus that incorporate rollers that extend along the entire width of the glass ribbon 103. However, in certain situations, a manufacturing apparatus that utilize rollers that extend along the entire width of the glass ribbon 103 may also be used.

As schematically shown and described above, the control device 370 may be provided to conduct any one of a variety or combination of functions. Although a single controller 377 is shown, multiple controllers may be provided in further embodiments, the term "controller" (e.g., "processor") can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more controllers that can comprise one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In some embodiments, the global control device 370 may use the fusion draw machine 140 to set a global master speed to control the ribbon thickness, as well as control and optimize the glass ribbon shape and stresses. Exemplary methods for controlling ribbon speed and thickness of the glass ribbon are also described in U.S. Patent Application No. 62/021,924 filed on Jul. 8, 2014, the entirety of which is incorporated herein by reference. FIG. 4 is a schematic, plan view of an embodiment of an edge trimming method and apparatus. With reference to FIG. 4, some embodiments may include an exemplary edge trimming apparatus 401 downstream of a forming vessel 143. In some embodiments, a glass ribbon 103 may be conveyed from a fusion draw machine 140 to subsequent processing stations or apparatuses in a vertical fashion or may be turned about a single axis orthogonal to the flow of the glass ribbon from the root of the forming vessel 143 such that the flow of the glass ribbon can be substantially horizontal. In other embodiments, a glass ribbon 103 may be conveyed from a fusion draw machine 140 to subsequent processing stations or apparatus by turning the ribbon about two axes, one or both of which are orthogonal to the flow of the glass ribbon from the root of the forming vessel 143 such that the flow of the glass ribbon can be either substantially horizontal but travel in a different direction than the embodiment in which the ribbon was turned about one axis or can be partially horizontal (less than 45 degrees as measured to the horizontal). In some embodiments, the glass ribbon 103 may be conveyed in a continuous fashion from the glass manufacturing apparatus 101 (FIG. 1) through the exemplary edge trimming apparatus 401. The glass ribbon 103 can include a pair of opposed first and second edges 402 and 404 that extend along a length of the glass ribbon 103 and a central portion 406 that spans between the first and second edges 402 and 404. In some non-limiting embodiments, the first and second edges 402 and 404 may be covered in a pressure sensitive adhesive tape 408 that can be used to protect and shield the first and second edges 402 and 404 from contact. The tape 408 may be applied to one or both of the first and second edges 402 and 404 as the glass ribbon 103 moves through the edge trimming apparatus 401. In other embodiments, the adhesive tape 408 may not be used. A first broad surface 410 and an opposite, second broad surface 412 also spans between the first and second edges 402 and 404, forming part of the central portion 406.

In embodiments where the glass ribbon 103 is formed using a down draw fusion process, the first and second edges 402 and 404 may include beads 414 and 416 with a thickness $T_1$ that is greater than a thickness $T_2$ within the central portion 406. The central portion 406 may have a thickness $T_2$ of less than or equal to about 1 mm, for example, from about 50 µm to about 750 µm, for example from about 100 µm to about 700 µm, for example from about 200 µm to about 600 µm, for example from about 300 µm to about 500 µm, and all subranges there between. The central portion 406 may also be "ultra-thin" having a thickness $T_2$ of about 0.3 mm or less including but not limited to thicknesses of, for example, about 0.01-0.05 mm, about 0.05-0.1 mm, about 0.1-0.15 mm and about 0.15-0.3 mm, although glass ribbons 103 with other thicknesses may be formed in other examples.

The beads 414, 416 can be removed using an exemplary edge trimming apparatus 401 as described below or in some embodiments can be removed on the draw while the ribbon is still vertically oriented below and downstream a forming vessel 143. In embodiments where the beads are removed on the draw, a first heating or cooling apparatus can be used to initiate a vertical crack below the root of a forming vessel in a continuously moving glass ribbon and a second heating or cooling apparatus can be used to locate or stop the initiated crack in the continuously moving glass ribbon. This second heating or cooling apparatus can be downstream of the first heating or cooling apparatus.

In additional embodiments, a first heating or cooling apparatus can be used to separate the continuously moving glass ribbon in the direction of flow and a second heating or cooling apparatus can be used to locate or stop the separation of the continuously moving glass ribbon before the root. A third heating or cooling apparatus either downstream of the first and second heating or cooling apparatuses or downstream of the first heating and cooling apparatus and upstream of the second heating or cooling apparatus can also be used. In some embodiments, the second heating or cooling apparatus is downstream of the first heating or cooling apparatus.

In yet further embodiments, a first heating or cooling apparatus can be used to initiate a crack in a viscoelastic region of the continuously moving glass ribbon, and a second heating or cooling apparatus to locate or stop the initiated crack in the continuously moving glass ribbon. The aforementioned first, second and/or third heating or cooling apparatuses can comprise at least one of a nozzle, jet, a laser, an IR heater and a burner. Such embodiments are further described in U.S. Application No. 62/134,827, entitled, "Methods and Apparatuses for Removing Edges of a Glass Ribbon," filed Mar. 18, 2015, the entirety of which is incorporated herein by reference.

In embodiments where the beads 414, 416 are removed using an exemplary edge trimming apparatus 401, the glass ribbon 103 can be conveyed through the apparatus 401 using a conveyor system 420 that can controlled by the global control device 370. Lateral guides 422 and 424 may be provided to orient the glass ribbon 103 in the correct lateral position relative to the machine or travel direction 426 of the glass ribbon 103. For example, as schematically shown, the lateral guides 422 and 424 may include rollers 428 that engage the first and second edges 402 and 404. Opposed forces 430 and 432 may be applied to the first and second edges 402 and 404 using the lateral guides 422 and 424 that help to shift and align the glass ribbon 103 in the desired lateral orientation in the travel direction 426. The edge trimming apparatus 401 can further include a cutting zone 440 downstream from a bend axis 442 about which the glass ribbon 103 may be bent. In one example, the edge trimming apparatus 401 may also include a cutting support member configured to bend the glass ribbon 103 in the cutting zone 440 to provide a bent target segment 444 with a bent orientation. Bending the target segment 444 within the cutting zone 440 can help stabilize the glass ribbon 103 during the cutting procedure. Such stabilization can help prevent buckling or disturbing the glass ribbon profile during the procedure of separating at least one of the first and second edges 402 and 404 from the central portion 406 of the glass ribbon 103. Providing the bent target segment 444 in the cutting zone 440 can increase the rigidity of the glass ribbon 103 throughout the cutting zone 440. In some embodiments, optional lateral guides 450, 452 can engage the glass ribbon 103 in a bent condition within the cutting zone 440. Forces 454 and 456 applied by the lateral guides 450 and 452 are therefore less likely to buckle or otherwise disturb the stability of the glass ribbon profile when laterally aligning as the glass ribbon 103 passes through the cutting zone 440. In other embodiments, a bent target segment may not be employed and the glass ribbon 103 may be maintained substantially flat in the cutting zone.

As set forth above, providing the bent target segment 444 in a bent orientation within the cutting zone 440 can help stabilize the glass ribbon 103 during the cutting procedure. Such stabilization can help prevent buckling or disturbing the glass ribbon profile during the procedure of separating at least one of the first and second edges 402 and 404. Moreover, the bent orientation of the bent target segment 444 can increase the rigidity of the bent target segment 444 to allow optional fine tune adjustment of the lateral orientation of the bent target segment 444. As such, the glass ribbon 103 can be effectively stabilized and properly laterally oriented without contacting the first and second broad surfaces of the central portion 406 during the procedure of separating at least one of the first and second edges 402 and 404 if beads are to be removed off the draw or no longer in a vertical position.

Figure 5:
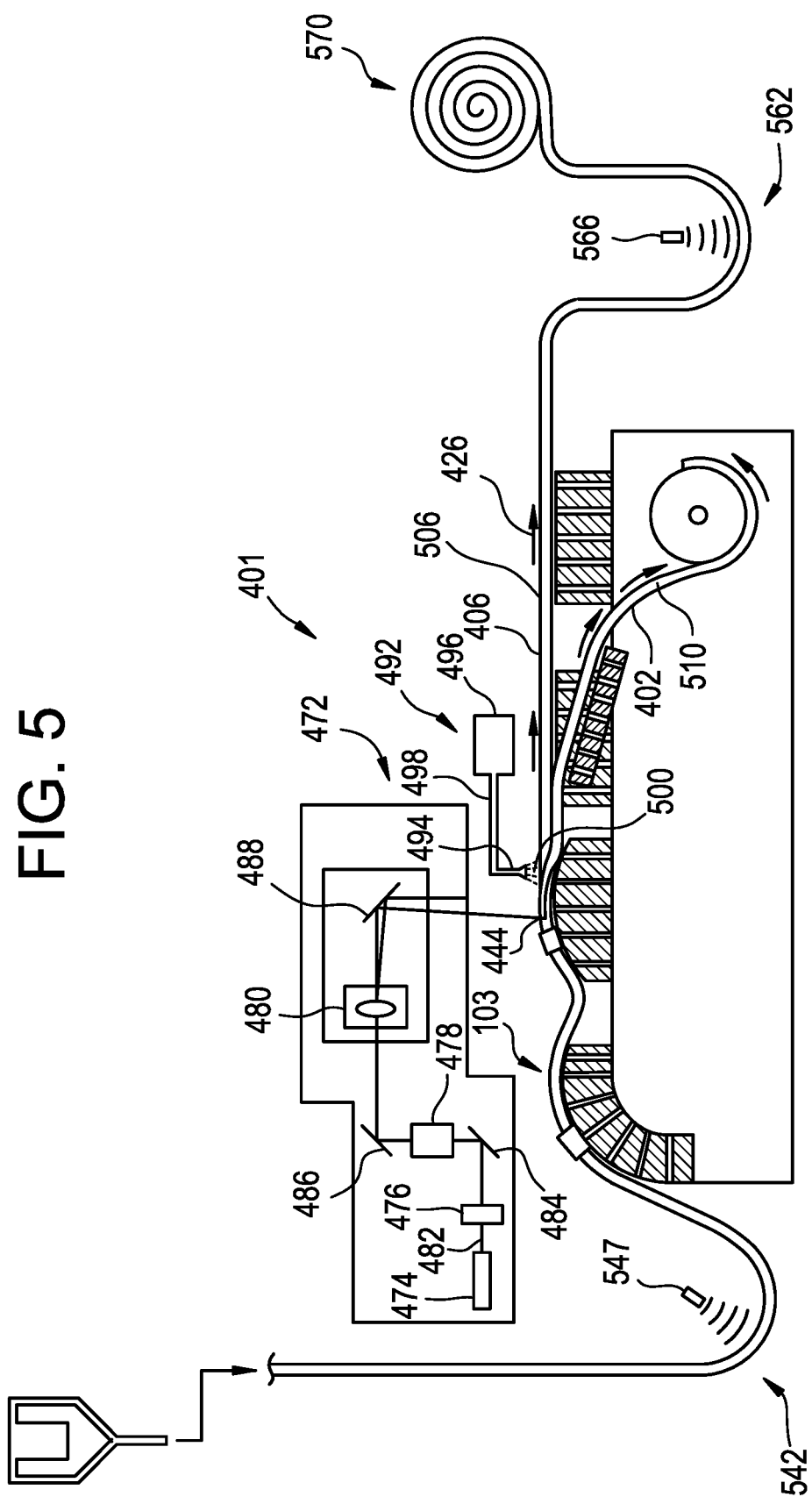
FIG. 5 is a schematic, side view of the edge trimming method and apparatus of FIG. 4.

The apparatus 401 can further include a wide range of edge trimming apparatus configured to separate the first and second edges 402 and 404 from the central portion 406 of the glass ribbon 103 in a continuous fashion. FIG. 5 is a schematic, side view of the edge trimming method and apparatus of FIG. 4. With reference to FIG. 5, in some embodiments an exemplary edge trimming apparatus 401 can include an optical delivery apparatus 472 for irradiating and therefore heating a portion of the upwardly facing surface of the bent target segment 444. In one example, the optical delivery apparatus 472 can comprise a cutting device such as, but not limited to, a laser 474 although other radiation sources may be provided in further examples. The optical delivery apparatus 472 can further include a circular polarizer 476, a beam expander 478, and a beam shaping apparatus 480. The optical delivery apparatus 472 may further comprise optical elements (e.g., mirrors 484, 486, 488) for redirecting a beam of radiation (e.g., laser beam 482) from the radiation source (e.g., laser 474). The radiation source can be configured to emit a laser beam having a wavelength and a power suitable for heating the glass ribbon 103 at a location where the beam is incident on the glass ribbon 103. In one embodiment, the laser 474 can comprise a $CO_2$ laser although other laser types may be used in other embodiments. As further shown in FIG. 5, the exemplary edge trimming apparatus 401 can also include a coolant fluid delivery apparatus 492 configured to cool the heated portion of the upwardly facing surface of the bent target segment 444. The coolant fluid delivery apparatus 492 can comprise a coolant nozzle 494, a coolant source 496 and an associated conduit 498 that may convey coolant to the coolant nozzle 494. In one example, a coolant jet 500 comprises water, but may be any suitable cooling fluid (e.g., liquid jet, gas jet or a combination thereof) that does not stain or damage the upwardly facing surface of the bent target segment 444 of the glass ribbon 103. The coolant jet 500 can be delivered to a surface of the glass ribbon 103 to form a cooling zone 502. As shown, the cooling zone 502 can trail behind a radiation zone 504 to propagate an initial crack (see FIG. 4).

The combination of heating and cooling with the optical delivery apparatus 472 and the coolant fluid delivery apparatus 492 can effectively separate the first and second edges 402 and 404 from the central portion 406 while minimizing or eliminating undesired residual stress, micro-cracks or other irregularities in the opposed edges 506, 508 of the central portion 406 that may be formed by other separating techniques. Moreover, due to the bent orientation of the bent target segment 444 within the cutting zone 440, the glass ribbon 103 can be positioned and stabilized to facilitate precise separating of the first and second edges 402 and 404 during the separating process. Still further, due to the convex surface topography of the upwardly facing convex support surface, the continuous strips of edge trim 510 and 512 can immediately travel away from the central portion 406, thereby reducing the probability that the first and second edges 402 and 404 will subsequently engage (and therefore damage) the first and second broad surfaces and/or the high quality opposed edges 506, 508 of the central portion 406. The central portion 406 may then be provided to additional process apparatuses downstream such as, but not limited to, a winding apparatus 570, additional cutting apparatuses, and the like (see, e.g., FIGS. 7-12).

Figure 6:
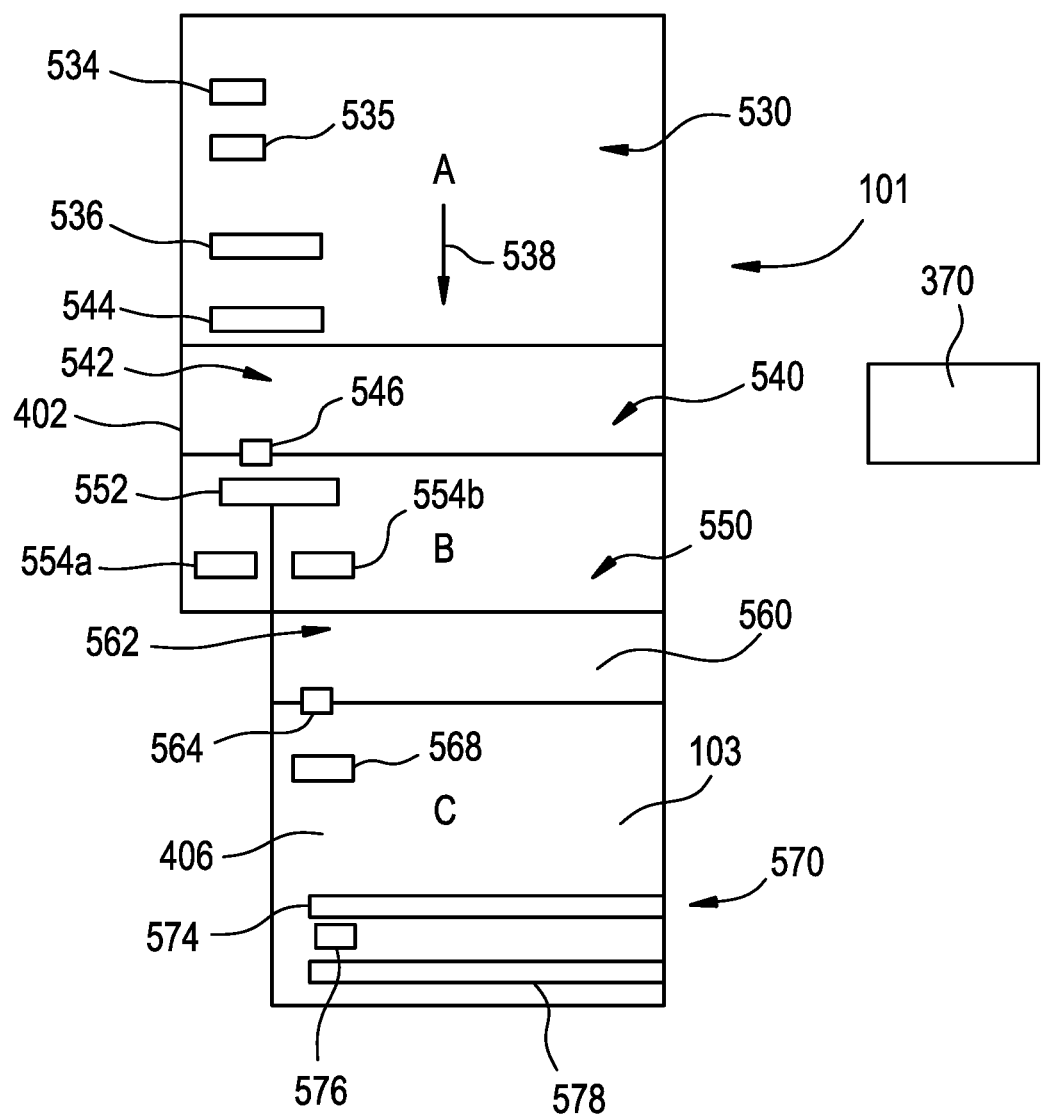
FIG. 6 is a schematic, plan view of some embodiments of the present subject matter.

FIG. 6 is a schematic, plan view of some embodiments of the present subject matter. With reference to FIG. 6, as can be appreciated, the various processes (e.g., forming, edge separating and rolling) may introduce instabilities, perturbations, vibrations, and transient effects to the glass ribbon 103 as the ribbon travels through an exemplary glass manufacturing system 101. To reduce the upstream and/or downstream impact of any instabilities, perturbations, vibrations, and transient effects, the processing apparatuses may be divided into a number of isolated processing zones, each zone corresponding to one or more different processes. In the illustrated example shown schematically, processing zone A includes a glass ribbon forming process, processing zone B includes a glass ribbon cutting process and processing zone C includes another glass ribbon process, such as a winding process, cutting process, or the like.

Processing zone A may include a delivery apparatus 530, similar to or the same as the delivery apparatus 133 described above with reference to FIG. 1, where a fusion draw, up draw, float, press rolling, slot draw or other suitable glass forming process can be used to produce the glass ribbon 103. Stability of the glass ribbon 103 within processing zone A may be achieved through use of driven rollers (e.g., multiple elevations of driven roller pairs) represented by elements 534, 535 and 536 applying adjustable mechanical tensions in the direction of travel shown by arrow 538 (for example, from about 0.36 kilograms per meter (kg/m) to about 8.9 kg/m (0.02 pounds per linear inch (pli) to about 0.5 pli), for example from about 0.9 kg/m to about 5.4 kg/m (from about 0.05 pli to about 0.3 pli), for example from about 1.4 kg/m to about 2.7 kg/m (from about 0.08 pli to about 0.15 pli)) as well as cross-direction tension, if needed. One or more of the driven rollers 534, 535 and 536 (e.g., driven roller 535) may also be used by the global control device 370 to set a global master speed, e.g., from about 84 millimeters per second (mm/s) to about 255 mm/s (e.g., from about 200 inches per minute (ipm) to about 600 ipm) of the glass ribbon 103 within at least processing zone A.

A buffer zone 540 can be provided between processing zone A and processing zone B for process isolation between the processing zones A and B. Within the buffer zone 540, the glass ribbon 103 may be held in a free loop 542 (see FIG. 5) and may hang in a catenary between two pay off positions defined by driven rollers 544 and 546 (more particularly, the location where the glass ribbon 103 releases from the driven rollers 544 and 546). For example, rollers 544 and 546 may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon 103 should be less than about 1.8 kg/m (about 0.1 pli), for example from about 0.18 kg/m to about 1.8 kg·m (from about 0.01 pli to about 0.1 pli) within the free loop 542.

The free loop 542 shape can self-adjust depending on the amount of pull force and gravitational force within the buffer zone 540. The free loop 542 can accommodate more or less glass ribbon 103 by adjusting the free loop 542 shape, which can be controlled by velocity at the exit of the free loop 542. The buffer zone 540 can thus serve as an accumulator of error between processing zones A and B. The buffer zone 540 can accommodate errors such as, but not limited to, path length differences due to velocity, twist or shape variance due to strain mismatch, and machine misalignment errors, to name a few. In some embodiments, a suitable loop sensor 547, e.g., an ultrasonic or optical sensor, may be provided to maintain a preselected loop height. In some embodiments, a tension sensor (e.g., a strain gauge) may be provided to measure tension within the glass ribbon 103. In some embodiments, the driving mechanism driving the rollers may have an in-line torque transducer to measure tension within the glass ribbon 103. The sensors may provide real-time information to the global control device 370, which can adjust the speed and/or tension of the driven rollers 544 and 546 based on the information.

Processing zone B may include an edge trimming apparatus 550, similar to or the same as the edge trimming apparatus 401 described above with reference to FIGS. 4 and 5, where first and second edges (only edge 402 is shown in FIG. 6) are separated from the central portion 406 of the glass ribbon 103. Of course, processing zone B may have any number or type of apparatuses therein as described below with reference to FIGS. 7-12 and this example should not limit the scope of the claims appended herewith. Stability of the glass ribbon 103 within the processing zone B may be achieved through use of driven rollers represented by elements 552 and 554*a* and 554*b*. Roller 546 may be driven during initial threading of the glass ribbon 103, but may thereafter be idle for cross-direction steering or guiding of the glass ribbon 103 within the processing zone B. The driven rollers 552, 554*a* and 554*b* may be used to provide tension (for example, from about 0.36 kilograms per meter to about 8.9 kg/m (0.02 pounds per linear inch to about 0.5 pli), for example from about 0.9 kg/m to about 5.4 kg/m (from about 0.05 pli to about 0.3 pli), for example from about 1.4 kg/m to about 2.7 kg/m (from about 0.08 pli to about 0.15 pli)) within the cutting zone 440 (see FIG. 4) and to control steering of the glass ribbon 103 and first and second edges (only edge 402 is shown) as they are separated from the central portion 406. One or more of the driven rollers 552 and 545*b* (e.g., driven roller 554*b*) may be used by the global control device 370 to set a local master speed (e.g., from about 84 mm/s to about 255 mm/s (e.g., from about 200 ipm to about 600 ipm)) within the processing zone B. It should be noted that within the zones A, B and C, one can manage tension and absolute error via local control and can then use isolation zones for error management.

Another buffer zone 560 can be provided between processing zone B and subsequent processing zone C for process isolation between the processing zones B and C. Within the buffer zone 560, the glass ribbon 103 may be held in a free loop 562 (see FIG. 5) and may hang in a catenary between two pay off positions defined by driven rollers 554*b* and 564). For example, rollers 554*b* and 564 may be from about 1 meter to about 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon 103 can be less than about 1.8 kg/m (about 0.1 pli), for example from about 0.18 kg/m to about 1.8 kg/m (from about 0.01 pli to about 0.1 pli) within the free loop 562. The free loop 562 shape can self-adjust depending on the amount of pull force and gravitational force within the buffer zone 560. The free loop 562 can accommodate more or less glass ribbon 103 by adjusting the free loop 562 shape, which can be controlled by velocity at the exit of the free loop 542. The buffer zone 560 can thus serve as an accumulator of error between processing zones B and C. The buffer zone 560 can accommodate errors such as path length differences due to velocity, twist or shape variance due to strain mismatch, and machine misalignment errors, to name a few. In some embodiments, a suitable loop sensor 566, e.g., an ultrasonic or optical sensor, may be provided to maintain a preselected loop height. In some embodiments, a tension sensor (e.g., a strain gauge) may be provided to measure tension within the glass ribbon 103. The sensors may provide real-time information to the global control device 370, which can adjust the speed and/or tension of the driven rollers 554b and 564 based on the information.

In some non-limiting embodiments, processing zone C may include a winding apparatus 570, where the central portion 406 of the glass ribbon 103 can be wound into a roll. In other embodiments, processing zone C may include additional cutting apparatus or stations. In embodiments using a winding apparatus 570 in processing zone C, stability of the glass ribbon 103 may be achieved through use of driven rollers represented by elements 568, 574, 576 and 578. Roller 564 may be driven during initial threading of the glass ribbon 103, but may thereafter be idle for cross-direction steering or guiding of the glass ribbon 103 within the processing zone C. The driven rollers 568, 574, 576 and 578 may be used to provide tension (e.g., from about 2.7 kg/m to about 6.3 kg/m (from about 0.15 pli to about 0.35 pli)) within processing zone C and to control steering of the glass ribbon 103. In some embodiments, for example, when a driven roller is used to apply tension to the glass as it is being rolled, due to increasing diameter of the glass roll, torque from that driven roller may be adjusted to result in tension (in the glass ribbon being rolled) decreasing from about 6.3 kg/m to about 2.7 kg/m (from about 0.35 pli to about 0.15 pli) as a linear ramp. One or more of the driven rollers 568, 574, 576 and 578 (e.g., driven rollers 574 and 578) may be used to by the global control device 370 to set a local master speed (e.g., from about 84 mm/s to about 255 mm/s (e.g., from about 200 ipm to about 600 ipm)) within the processing zone C.

Figure 7:
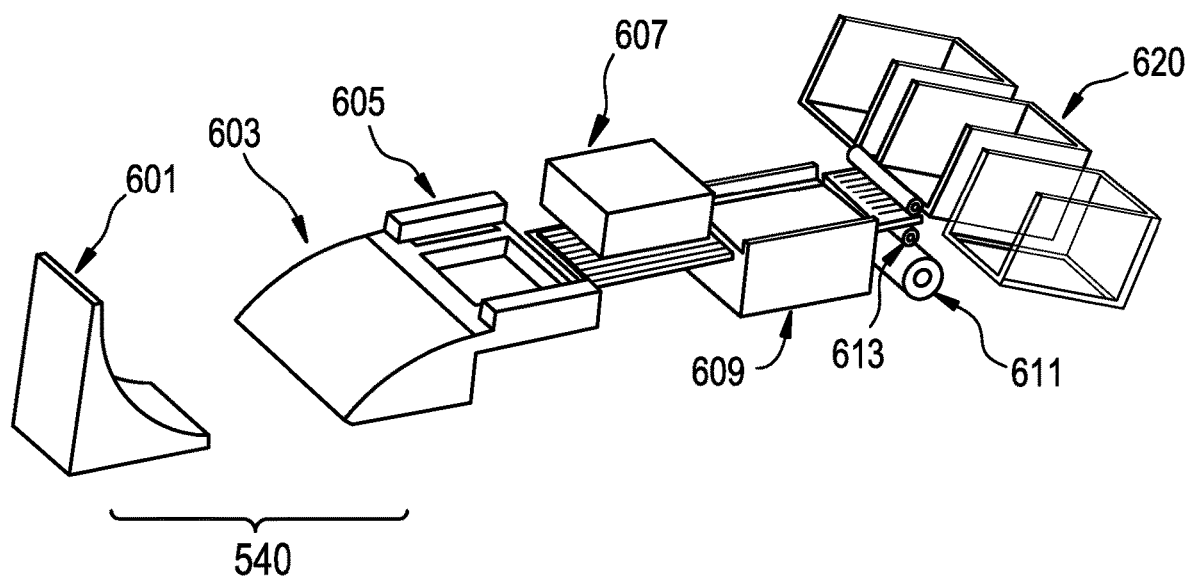
FIG. 7 is a schematic depiction of some embodiments of the present subject matter.

The isolation and tension concepts described above can be applied to many embodiments in which glass ribbons and/or sheets are conveyed horizontally or vertically. For example, FIG. 7 is a schematic depiction of some embodiments of the present subject matter. With reference to FIG. 7, the depicted embodiment can be downstream of processing zone A which can include a delivery apparatus where a fusion draw or other forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by a driven roller on the catenary 601 and a driven roller on a subsequent turtleback 603. These rollers may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone B can include a traveling anvil machine 605 or other suitable mechanical apparatus configured to separate a glass ribbon orthogonally to the direction of ribbon movement to create glass sheets. An exemplary traveling anvil machine 605 can be used to score and break the glass ribbon with glass ribbon movement resulting in a substantially straight score. In other embodiments, a laser mechanism (not shown) may be utilized in place of the traveling anvil machine 605 for the same purpose. Subsequent the horizontal traveling anvil machine 605, an inspection station 607 may be provided to analyze warp, cut, adhered glass, or the like and beads may be removed using a suitable edge trimming mechanism 609 (see FIG. 4). Suitable edge trimming mechanisms 609 can include mechanical and/or optical removal of the beads. After removal of the beads, a protective laminate may be applied to one or both surfaces of the glass sheet using suitable interleaving mechanisms 611 configured to provide an interleaf material (e.g., Visqueen 613, paper, other polyethylene sheeting, and the like), a coating, or both on one or both sides of the glass sheet. The laminated glass sheet can then be placed in one or more suitable packaging crates 620. In some embodiments, these packaging crates 620 are indexable in a direction orthogonal to the direction of travel of the laminated glass sheets so that when one crate is filled to a predetermined level, another crate can be indexed in its place using, for example, a cross-shuttle or other suitable indexing mechanism. In the depicted embodiment, the processing performed in processing zone B can be performed horizontally and in line.

Figure 8:
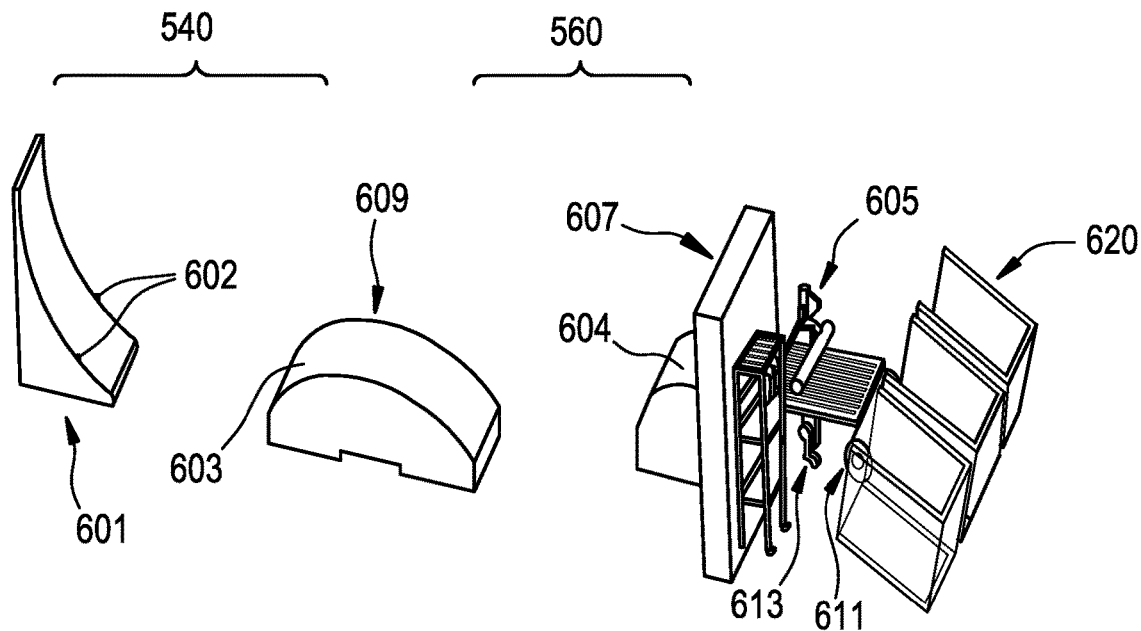
FIG. 8 is a schematic depiction of other embodiments of the present subject matter.

By way of further example, FIG. 8 is a schematic depiction of other embodiments of the present subject matter. With reference to FIG. 8, the depicted embodiment can be downstream of processing zone A which can include a delivery apparatus where a fusion draw or other forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by a driven roller(s) (e.g., nip roller 602) on the catenary 601 and a driven roller on a subsequent turtleback 603. These rollers may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone B can include a suitable edge trimming mechanism 609 (see FIG. 4) to remove beads on the glass ribbon. Suitable edge trimming mechanisms 609 can include mechanical and/or optical removal of the beads in a continuous or non-continuous manner. Another buffer zone 560 can be provided between processing zone B and subsequent processing zone C for process isolation between processing zones B and C. Within the buffer zone 560, the glass ribbon may be held in a free loop 562 (see FIG. 5) and may hang in a catenary between two pay off positions defined by driven rollers on the catenary and driven rollers on a subsequent turtleback 604. Between these two pay off positions the glass ribbon 103 may be held in a free loop which is designed to enable isolation using catenary principles. The free loop 562 shape can self-adjust depending on the amount of pull force and gravitational force within the buffer zone 560. The free loop 562 can accommodate more or less glass ribbon by adjusting the free loop 562 shape, which can be controlled by velocity at the exit of the free loop 542. The buffer zone 560 can serve as an accumulator of error between processing zones B and C. The buffer zone 560 can accommodate errors for example path length differences due to velocity, twist or shape variance due to strain mismatch and machine misalignment errors. In some embodiments, a loop sensor 566 may be provided to maintain a preselected loop height. In some embodiments, a tension sensor may be provided to measure tension within the glass ribbon. The sensors may provide real-time information to the global control device 370, which can adjust the speed and/or tension of the driven rollers based on the information. In processing zone C, an inspection station 607 may be provided to analyze warp, cut, adhered glass, or the like followed by a nick and bend device 605 or other suitable mechanical apparatus configured to separate a glass ribbon orthogonally to the direction of ribbon movement to create glass sheets. An exemplary nick and bend device 605 can be used to score and break the glass ribbon with glass ribbon movement resulting in a substantially straight score. In other embodiments, a laser mechanism (not shown) may be utilized in place of the nick and bend device 605 for the same purpose. Subsequent the horizontal nick and bend device 605, a protective laminate may be applied to one or both surfaces of the glass sheet using suitable interleaving mechanisms 611 configured to provide an interleaf material (e.g., Visqueen 613, paper, other polyethylene sheeting, and the like), a coating, or both on one or both sides of the glass sheet. The laminated glass sheet can then be placed in one or more suitable packaging crates 620. In some embodiments, these packaging crates 620 are indexable in a direction orthogonal to the direction of travel of the laminated glass sheets so that when one crate is filled to a predetermined level, another crate can be indexed in its place using, for example, a cross-shuttle or other suitable indexing mechanism. In the depicted embodiment, the processing performed in processing zones B and C can be performed horizontally and in line.

Figure 9:
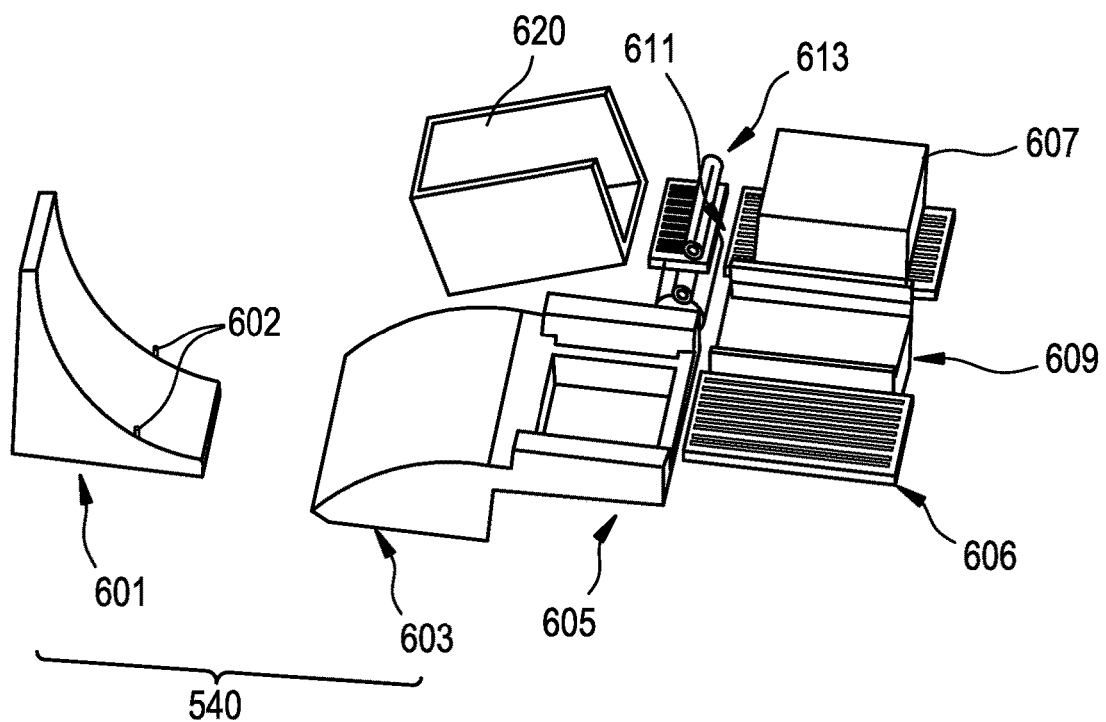
FIG. 9 is a schematic depiction of further embodiments of the present subject matter.

FIG. 9 is a schematic depiction of further embodiments of the present subject matter. With reference to FIG. 9, the depicted embodiment can be downstream of processing zone A which can include a delivery apparatus where a fusion draw or other suitable forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by driven rollers (e.g., nip rollers 602) on the catenary 601 and a driven roller on a subsequent turtleback 603. These rollers may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone B can include a traveling anvil machine 605 or other suitable mechanical apparatus configured to separate a glass ribbon orthogonally to the direction of ribbon movement to create glass sheets. An exemplary traveling anvil machine 605 can be used to score and break the glass ribbon with glass ribbon movement resulting in a substantially straight score. In other embodiments, a laser mechanism (not shown) may be utilized in place of the traveling anvil machine 605 for the same purpose. Subsequent the horizontal traveling anvil machine 605, the direction of glass conveyance can be adjusted at an accumulator or weigh station 606 (in the non-limited depicted case by 90 degrees) and beads may be then removed using a suitable edge trimming mechanism 609 (see FIG. 4) in the adjusted glass conveyance direction. Suitable edge trimming mechanisms 609 can include mechanical and/or optical removal of the beads. An inspection station 607 may then be provided to analyze warp, cut, adhered glass, or the like and after inspection thereof, a protective laminate may be applied to one or both surfaces of the glass sheet using suitable interleaving mechanisms 611 configured to provide an interleaf material (e.g., Visqueen 613, paper, other polyethylene sheeting, and the like), a coating, or both on one or both sides of the glass sheet. The laminated glass sheet can then be placed in one or more suitable packaging crates 620. In some embodiments, these packaging crates 620 are indexable in a direction orthogonal to the direction of travel of the laminated glass sheets so that when one crate is filled to a predetermined level, another crate can be indexed in its place using, for example, a cross-shuttle or other suitable indexing mechanism. In the depicted embodiment, the processing performed in processing zone B can be performed horizontally; however, after singulation into sheets, the remaining process flow can be perpendicular to incoming process flow to reduce overall system footprint.

Figure 10:
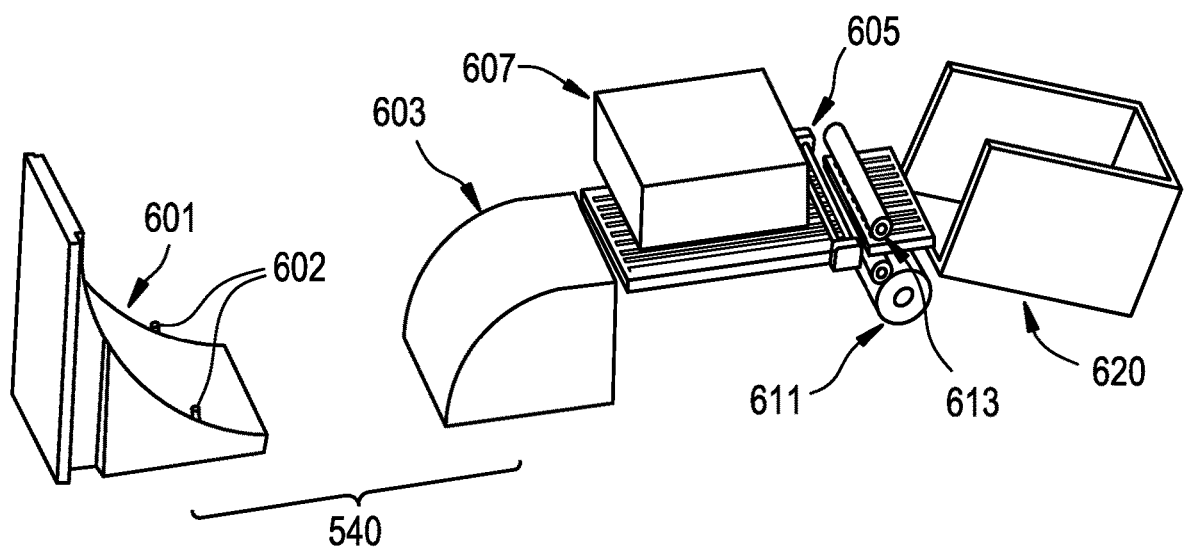
FIG. 10 is a schematic depiction of additional embodiments of the present subject matter.

FIG. 10 is a schematic depiction of additional embodiments of the present subject matter. With reference to FIG. 10, the depicted embodiment can be downstream of processing zone A which can include a delivery apparatus where a fusion draw or other suitable forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by driven rollers (e.g., nip rollers 602) on the catenary 601 and a driven roller on a subsequent turtleback 603. These rollers may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone A includes removal of beads from the glass ribbon on the draw and discussed above and further disclosed in U.S. Application No. 62/134,827, entitled, "Methods and Apparatuses for Removing Edges of a Glass Ribbon," filed Mar. 18, 2015, the entirety of which is incorporated herein by reference. Bead removal can also be facilitated using chutes 602 accessible on the catenary 601 or other suitable removal mechanisms. Processing zone B can include an inspection station 607 to analyze warp, cut, adhered glass, or the like and after inspection thereof, a nick and bend device 605 or other suitable mechanical apparatus configured to separate a glass ribbon orthogonally to the direction of ribbon movement to create glass sheets can be provided. In other embodiments, a laser mechanism (not shown) may be utilized in place of the nick and bend device 605 for the same purpose. Subsequent to the nick and bend device 605, a protective laminate may be applied to one or both surfaces of the glass sheet using suitable interleaving mechanisms 611 configured to provide an interleaf material (e.g., Visqueen 613, paper, other polyethylene sheeting, and the like), a coating, or both on one or both sides of the glass sheet. The laminated glass sheet can then be placed in one or more suitable packaging crates 620. In some embodiments, these packaging crates 620 are indexable in a direction orthogonal to the direction of travel of the laminated glass sheets so that when one crate is filled to a predetermined level, another crate can be indexed in its place using, for example, a cross-shuttle or other suitable indexing mechanism. In the depicted embodiment, the processing performed in processing zone B can be performed horizontally and in line.

Figure 11:
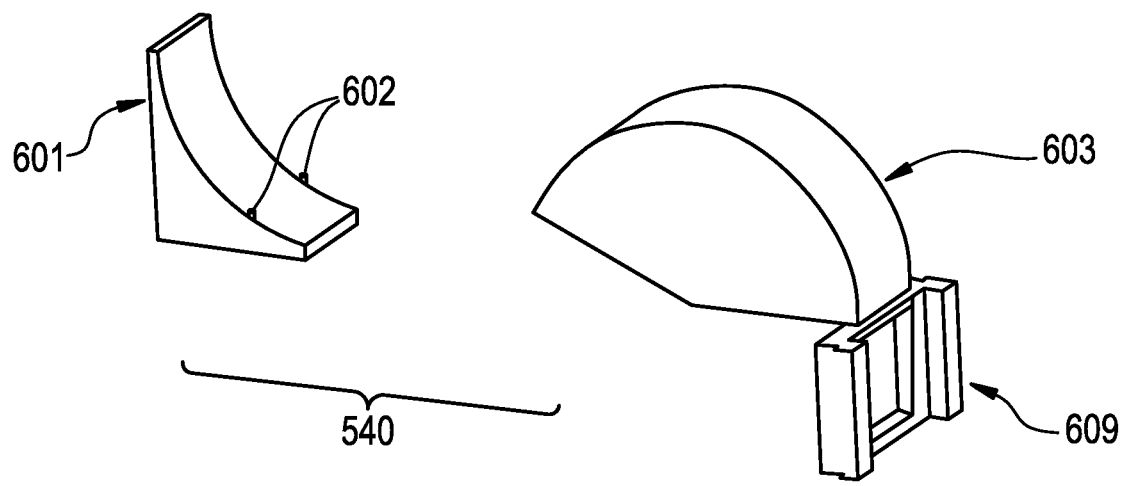
FIG. 11 is a schematic depiction of further embodiments of the present subject matter.

FIG. 11 is a schematic depiction of further embodiments of the present subject matter. With reference to FIG. 11, the depicted embodiment can be downstream of processing zone A which can include a delivery apparatus where a fusion draw or other suitable forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by driven rollers (e.g., nip rollers 602) on the catenary 601 and a driven roller on a subsequent turtleback 603. These rollers may be from 1 meter to 12 meters apart, for example, from about 1.5 meters to about 7.5 meters apart, to allow use of a number of cullet chutes, loop out mitigation devices, etc. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone B includes a turtleback 603 which, contrary to the embodiments depicted in FIGS. 7-10, returns the glass ribbon or web to a vertical orientation. From this orientation, a traveling anvil machine or other suitable mechanical apparatus configured to separate a glass ribbon orthogonally to the direction of ribbon movement to create glass sheets can be provided. In other embodiments, a laser mechanism (not shown) may be utilized in place of the traveling anvil machine for the same purpose. Additionally, bead removal can be performed on the draw in processing zone A or can be performed in processing zone B after the turtleback 603 using a suitable edge trimming mechanism 609 (see FIG. 4) while the glass ribbon is in a vertical orientation or while it is in a horizontal orientation (not shown). Suitable edge trimming mechanisms can also include removal via lasers or the like. Additionally, bead removal may occur before or after singulation of the glass ribbon into glass sheets. While not shown, processing zone B can include an inspection station (to analyze warp, cut, adhered glass, or the like and after inspection thereof), a lamination and interleaving station, and a packaging station, as discussed above in a vertical, near vertical or horizontal orientation. In the depicted embodiment, the processing performed in processing zone B can be performed vertically and/or horizontally and/or in line or perpendicular to incoming process flow.

Figure 12:
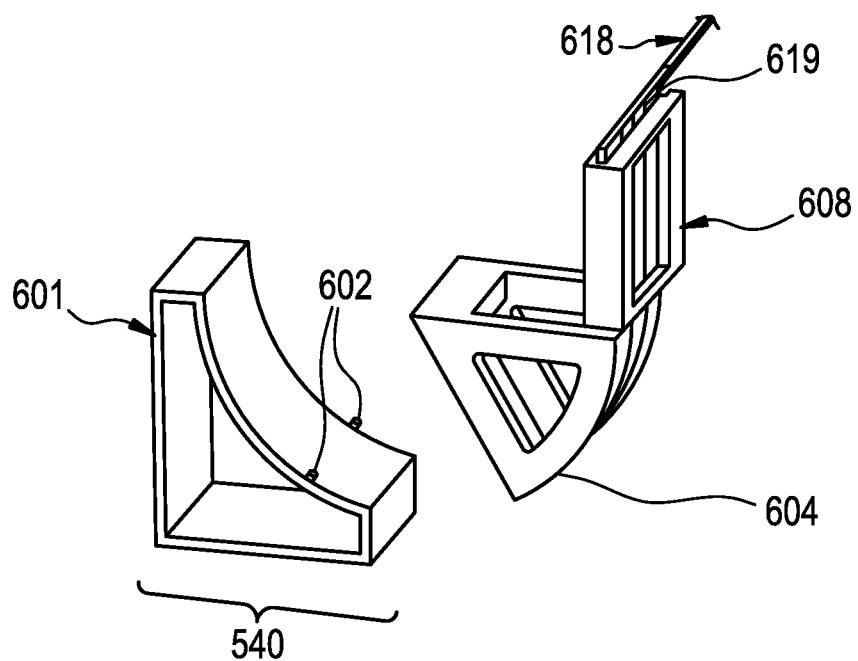
FIG. 12 is a schematic depiction of additional embodiments of the present subject matter.

FIG. 12 is a schematic depiction of additional embodiments of the present subject matter. With reference to FIG. 12, the depicted embodiment can be downstream of processing zone A which can include a delivery apparatus where a fusion draw or other suitable forming process can be used to produce a glass ribbon. A buffer zone 540 can be provided between processing zone A and processing zone B for process isolation between the processing zones. Within the buffer zone 540, the glass ribbon may be held in a free loop 542 (see FIG. 5) and may hang in a catenary 601 between two pay off positions defined by driven rollers (e.g., nip rollers 602) on the catenary 601 and a threading and scoring mechanism 604. Between these two pay off positions the glass ribbon 103 may be held in a free loop which is designed to enable isolation using catenary principles. For example, the tension in the glass ribbon should be less than about 1.8 kg/m (about 0.1 pli), for example from about 0.18 kg/m to about 1.8 kg·m (from about 0.01 pli to about 0.1 pli) within the free loop 542. The free loop 542 shape can self-adjust depending on the amount of pull force and gravitational force within the buffer zone 540. The free loop 542 can accommodate more or less glass ribbon by adjusting the free loop 542 shape, which can be controlled by velocity at the exit of the free loop 542. The buffer zone 540 can serve as an accumulator of error between processing zones A and B. The buffer zone 540 can accommodate errors for example path length differences due to velocity, twist or shape variance due to strain mismatch and machine misalignment errors. In some embodiments, a loop sensor may be provided to maintain a preselected loop height. In some embodiments, a tension sensor may be provided to measure tension within the glass ribbon. In some embodiments, the driving mechanism driving the rollers may have an in-line torque transducer to measure tension within the glass ribbon. The sensors may provide real-time information to the global control device 370, which can adjust the speed and/or tension of the driven rollers and based on the information. Thus, this buffer zone 540 can act to convey glass away from a formed glass centerline of the delivery apparatus (e.g., fusion draw machine or equivalent) in processing zone A in a controlled manner such that downstream processes are isolated from the glass forming process. In the depicted embodiment, processing zone B includes a threading and scoring mechanism 604 which can, in some embodiments, comprise a rotatable or fixed mechanism configured to deliver the glass ribbon from the free loop 542 and/or catenary 601 to a vertically oriented delivery system 608 configured to convey glass in a vertical orientation but laterally and orthogonally to the direction of travel of the glass ribbon in the first processing zone. Located on an end of the threading and scoring mechanism 604 distal to the catenary 601 can be provided a scoring device configured to separate the glass ribbon orthogonally to the direction of ribbon movement to create glass sheets. This scoring device may be mechanical in nature or may be optical (e.g., laser) each providing the ability to score the glass ribbon.

An exemplary vertically oriented delivery system 608 can comprise a robot or other device configured to separate the scored portion of the ribbon into a glass sheet and permit movement of the separated glass sheets from a support rail 618 or conveyance mechanism with a hanging device. For example, after scoring and separation of the glass sheet, the robot or other device may transport and reorient the glass sheet in a proper position for hanging the glass sheets from the support rail 618 with an exemplary hanging device 619. Support rails in some embodiments may be securely mounted with respect to a support surface of a room (e.g., a clean room). For example, the support rail 618 can be hung with a beam or other support member from a ceiling of the room or in other embodiments, the support rail 618 may be supported from below (e.g., from a floor of a clean room) or from the sides (e.g., walls of a clean room). As the support rail 618 may be securely mounted in place, the hanging device 619 can effectively support the weight of the glass sheets by hanging the glass sheets from the support rail 618. Transport of the glass sheets can occur via the support rail 618 to additional processing stations (e.g., inspection, washing, finishing, bead separation, packaging, etc.) as necessary. An exemplary vertically oriented delivery system 608 can include, but is not limited to, any one or several of the embodiments described in U.S. Application No. 62/066,656, entitled, "Glass Sheet Processing Apparatus and Methods," filed Oct. 21, 2014, the entirety of which is incorporated herein by reference.

The above-described methods and apparatus for continuous manufacturing of glass ribbon can provide thin to ultra-thin glass ribbon while maintaining precise glass ribbon position management in each respective processing zone (e.g., forming, cutting, etc.). As a moving body, the glass ribbon can travel along a pre-defined direction, aligned with the various processing apparatus. Tension within the glass ribbon can be adequate and conform to the needs of each of the processing steps within each of the processing zones. The processing zones and their respective process steps can be isolated from process steps of the other processing zones using the buffer zones and free loops. The global control device can control tension and velocity locally within each of the processing zones and globally using real-time feedback from the various tension, speed and position sensors located within the processing zones.

Some embodiments provide independent tension control between the respective forming apparatus and subsequent processing steps using a catenary to bend formed glass ribbon from vertical to horizontal and catenary nip drives to manage and to isolate ribbon tension between the delivery apparatus and subsequent processing stations. In other embodiments, isolation of web or ribbon motion may occur with use of one or more free loops having an accumulation capability and/or with use of optimized horizontal or vertical ribbon or sheet conveyance and processes. In further embodiments, a higher throughput and yield can be affected as a result of reduced cycle time and isolation of sheet separation using free loops and catenaries as well as optimized horizontal and/or vertical ribbon/sheet conveyance and processes.

Some embodiments provide advantages of tension and position control to enable stable forming and other processes, e.g., the isolation of forming processes from glass sheet singulation, bead separation and other processing. This isolation has been discovered to immediately impact and improve product attributes. In further embodiments, optimized conveyance can enable a reduced cycle time (e.g., by continuous feeding of sheets or provision of plural robots for sheet handling) and a higher yield (e.g., by providing separation further downstream). Additional embodiments can find utility through the retrofitting of existing infrastructure to enable asset utilization, e.g., modification may not be needed to melting and forming apparatuses and systems, hence no modification of the building infrastructure would be required.

In some embodiments a method of processing a glass ribbon is provided. The method can comprise forming a glass ribbon in a first processing zone, continuously feeding the glass ribbon from the first processing zone having a first direction of travel to a second processing zone having a second direction of travel orthogonal to the first direction of travel, controlling feed rate of the glass ribbon through each of the first processing zone and second processing zone using a global control device, cutting the glass ribbon in the second processing zone, and isolating the first processing zone from perturbations occurring in the second processing zone. In some embodiments, the step of cutting the glass ribbon in the second processing zone further comprises separating one or more edges of the glass ribbon to remove any beads adjacent the one or more edges. In other embodiments, the step of cutting the glass ribbon in the second processing zone further comprises separating the glass ribbon in a direction substantially orthogonal to the second direction of travel to create a glass sheet. In further embodiments, the step of forming further comprises separating one or more edges of the glass ribbon to remove any beads adjacent the one or more edges. In additional embodiments, the step of continuously feeding the glass ribbon further comprises continuously feeding the glass ribbon from the second processing zone to a third processing zone. Some embodiments further comprise the step of isolating the second processing zone from perturbations occurring in the third processing zone. In some embodiments, the step of cutting the glass ribbon further comprises separating one or more edges of the glass ribbon to remove any beads adjacent the one or more edges and wherein the method further comprises any one or combination of inspecting the glass ribbon in the third processing zone, separating the glass ribbon in a direction substantially orthogonal to the second direction of travel to create a glass sheet, packaging the glass sheet, and laminating the glass sheet. In additional embodiments, the method further comprises any one or combination of inspecting the glass ribbon in the second processing zone, separating the glass ribbon in a direction substantially orthogonal to the second direction of travel to create a glass sheet, packaging the glass sheet, and laminating the glass sheet. In further embodiments, the step of forming further comprises forming using a fusion draw, slot draw, float, or redraw process to form the glass ribbon. In additional embodiments, the step of controlling further comprises controlling a feed rate of the glass ribbon within the first processing zone, second processing zone, or both first and second processing zones. In any of these embodiments, the first direction of travel is vertical and the second direction of travel is horizontal or the first direction of travel is vertical and the second direction of travel is lateral. In some embodiments, the glass ribbon has a thickness of less than 0.5 mm. In further embodiments, the step of controlling further comprises controlling tension in the first and second directions of travel through the first and second processing zones and first buffer zone.

In further embodiments, a glass processing apparatus is provided comprising a forming apparatus in a first processing zone, the forming apparatus configured to form a glass ribbon having a first direction of travel in the first processing zone, a first cutting apparatus in a second processing zone, the first cutting apparatus configured to separate one or more portions of the glass ribbon, the glass ribbon having a second direction of travel, and a first buffer zone between the first processing zone and the second processing zone in which the glass ribbon is supported in a first catenary between two, spaced-apart payoff positions where the second direction of travel in the second processing zone is orthogonal to the first direction of travel in the first processing zone. Some embodiments further comprise a second buffer zone between the second processing zone and a third processing zone in which the glass ribbon is supported in a second catenary between two, spaced-apart payoff positions. In further embodiments, the third processing zone further comprises any one or combination of an inspection station, a second cutting apparatus, a packaging station, and a lamination station. In other embodiments the forming apparatus is configured to form the glass ribbon using a fusion draw, slot draw, float, or redraw process. In some embodiments, the first cutting apparatus is configured to separate one or more edges of the glass ribbon to remove any beads adjacent the one or more edges. In further embodiments, the first cutting apparatus is configured to separate the glass ribbon in a direction substantially orthogonal to the second direction of travel to create a glass sheet. In additional embodiments, the first processing zone further comprises a second cutting mechanism configured to separate one or more of the edges of the glass ribbon along the first direction of travel. Some embodiments further comprise a global control device that controls a feed rate of the glass ribbon within the first processing zone, second processing zone, or both first and second processing zones. In further embodiments, the second processing zone further comprises any one or combination of an inspection station, a second cutting apparatus, a packaging station, and a lamination station. In any of these embodiments, the first direction of travel is vertical and the second direction of travel is horizontal or the first direction of travel is vertical and the second direction of travel is lateral. In some embodiments, the glass ribbon has a thickness of less than 0.5 mm. In additional embodiments, the first cutting apparatus is mechanical or optical.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for embodiment, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What we claim is:

1. A method of processing a glass ribbon comprising:
   forming a glass ribbon in a first processing zone;
   continuously feeding the glass ribbon from the first processing zone having a first direction of travel to a second processing zone having a second direction of travel orthogonal to the first direction of travel;
   controlling feed rate of the glass ribbon through each of the first processing zone and second processing zone using a global control device;
   cutting the glass ribbon in the second processing zone; and
   isolating the first processing zone from perturbations occurring in the second processing zone.

2. The method of claim 1, wherein the step of cutting the glass ribbon in the second processing zone further comprises separating one or more edges of the glass ribbon to remove any beads adjacent the one or more edges.

3. The method of claim 1, wherein the step of cutting the glass ribbon in the second processing zone further comprises separating the glass ribbon in a direction substantially orthogonal to the second direction of travel to create a glass sheet.

4. The method of claim 1, wherein the step of forming further comprises separating one or more edges of the glass ribbon to remove any beads adjacent the one or more edges.

5. The method of claim 1, wherein the step of continuously feeding the glass ribbon further comprises continuously feeding the glass ribbon from the second processing zone to a third processing zone.

6. The method of claim 5, further comprising the step of isolating the second processing zone from perturbations occurring in the third processing zone.

7. The method of claim 5, wherein the step of cutting the glass ribbon further comprises separating one or more edges of the glass ribbon to remove any beads adjacent the one or more edges and wherein the method further comprises any one or combination of the following steps:
   inspecting the glass ribbon in the third processing zone,
   separating the glass ribbon in a direction substantially orthogonal to the second direction of travel to create a glass sheet,
   laminating the glass sheet, and
   packaging the glass sheet.

8. The method of claim 1 further comprising any one or combination of the following steps:
   inspecting the glass ribbon in the second processing zone,
   separating the glass ribbon in a direction substantially orthogonal to the second direction of travel to create a glass sheet,
   laminating the glass sheet, and
   packaging the glass sheet.

9. The method of claim 1, wherein the step of forming further comprises forming using a fusion draw, slot draw, float, or redraw process to form the glass ribbon.

10. The method of claim 1, wherein the step of controlling further comprises controlling a feed rate of the glass ribbon within the first processing zone, second processing zone, or both first and second processing zones.

11. The method of claim 1, wherein the first direction of travel is vertical and the second direction of travel is horizontal.

12. The method of claim 1, wherein the first direction of travel is vertical and the second direction of travel is lateral.

13. The method of claim 1, wherein the glass ribbon has a thickness of less than 0.5 mm.

14. The method of claim 1, wherein the step of controlling further comprises controlling tension in the first and second directions of travel through the first and second processing zones and first buffer zone.

* * * * *